US008099773B2

(12) United States Patent
Jung et al.

(10) Patent No.: US 8,099,773 B2
(45) Date of Patent: Jan. 17, 2012

(54) NETWORK SCAN SYSTEM PASSING THROUGH FIREWALL AND METHOD OF ORGANIZING THE SAME

(75) Inventors: Joo-young Jung, Yongin-si (KR); In-chang Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1089 days.

(21) Appl. No.: 11/147,315

(22) Filed: Jun. 8, 2005

(65) Prior Publication Data

US 2006/0064744 A1    Mar. 23, 2006

(30) Foreign Application Priority Data

Sep. 20, 2004    (KR) .................. 10-2004-0075061

(51) Int. Cl.
H04N 1/327   (2006.01)
G06F 15/16   (2006.01)

(52) U.S. Cl. ............... 726/11; 726/5; 726/28; 358/442

(58) Field of Classification Search ............. 358/442; 726/4, 5, 28, 29, 11; 399/80; 713/183
See application file for complete search history.

(56) References Cited

U.S. PATENT DOCUMENTS

| 6,208,426 | B1 * | 3/2001 | Saito et al. ............. 358/1.15 |
| 6,804,016 | B2 * | 10/2004 | Hashimoto et al. ........ 358/1.13 |
| 7,113,971 | B1 * | 9/2006 | Ohi et al. .................. 709/203 |
| 2002/0012046 | A1 | 1/2002 | Ishino |
| 2002/0107937 | A1 * | 8/2002 | Iyoki ......................... 709/217 |
| 2002/0107983 | A1 * | 8/2002 | Iyoki ......................... 709/245 |
| 2003/0217282 | A1 * | 11/2003 | Henry ........................ 713/200 |
| 2004/0093598 | A1 * | 5/2004 | Haga et al. .................. 717/173 |
| 2004/0139007 | A1 * | 7/2004 | Singh et al. .................. 705/39 |
| 2005/0046894 | A1 * | 3/2005 | Hagiwara et al. ......... 358/1.15 |
| 2006/0155864 | A1 * | 7/2006 | Izumi ......................... 709/230 |

FOREIGN PATENT DOCUMENTS

| CN | 1327190 | 12/2001 |
| JP | 2001-61032 | 3/2001 |
| JP | 2001-134404 | 5/2001 |
| JP | 2002-354164 | 12/2002 |
| JP | 2003-304340 | 10/2003 |
| JP | 2004-64336 | 2/2004 |
| KR | 100238685 B1 | 10/1999 |
| KR | 2001-56597 A | 7/2001 |
| KR | 2002-71631 A | 9/2002 |
| WO | WO 2004034657 A1 * | 4/2004 |

OTHER PUBLICATIONS

Hypertext Transfer Protocol—HTTP/1.1 (Jun. 1999).*
Uniform Resource Locators (URL) (Dec. 1994).*
How Secure are the Root DNS Servers? (Mar. 2003).*
Chinese Office Action dated Mar. 9, 2007 issued in CN 200510099619.3.

* cited by examiner

Primary Examiner — David J Pearson
Assistant Examiner — Justin T Darrow
(74) Attorney, Agent, or Firm — Stanzione & Kim, LLP

(57) ABSTRACT

A network scan system includes a network scanner accessible by a computer and capable of communicating with the computer through a firewall. A method of operating the network scan system includes installing a hypertext transfer protocol (HTTP) server module into the computer, transmitting a uniform resource locator (URL) of the computer to the network scanner using the HTTP server module, and transmitting scanned data to the computer from the network scanner using the transmitted URL. Accordingly, it is possible to exchange data between the network scanner and the computer using the HTTP server module installed into the computer even if a firewall is installed.

21 Claims, 4 Drawing Sheets

NETWORK SCAN SYSTEM PASSING THROUGH FIREWALL AND METHOD OF ORGANIZING THE SAME

CROSS-REFERENCE TO RELATED APPLICATIONS

This application claims the priority under 35 U.S.C. §119 of Korean Patent Application No. 10-2004-75061, filed on Sep. 20, 2004 in the Korean Intellectual Property Office, the disclosure of which is incorporated herein in its entirety by reference.

BACKGROUND OF THE INVENTION

1. Field of the Invention

The present general inventive concept relates to a network scan system and a method of constructing the same, and more particularly, to a network scan system constructed by installing a Hyper-Text Transfer Protocol (HTTP) server module into a computer accessing a network scanner, such that the network scanner can communicate with the computer through a firewall, which is installed where the computer is installed, and exchange data with the computer, and a method of configuring the network scan system.

2. Description of the Related Art

In general, a scanner or a multi-functional apparatus, which has functions of a scanner, a printer, a copy machine, and a facsimile, can be connected to a plurality of computers via a network. Conventionally, a network scan system is configured by additionally installing a data storage server in a scanner. Such a network scanner is disclosed in U.S. Pat. No. 6,223,223.

FIG. 1 is a block diagram of a conventional network scan system. The conventional network scan system of FIG. 1 is constructed by connecting a predetermined server 300 to a scanner 100 and forming a network by allowing the server 100 to access a computer 200. Although FIG. 1 illustrates that the computer 200 is connected to the scanner 100 via the server 300, the number of computers and scanners is not limited in the conventional network scan system. That is, a plurality of computers can be connected to a plurality of scanners. If users register user accounts with the server 300, an available user list is registered with the server 300.

When a user desires to scan a document, the user must go to the scanner 100 and log in using a registered user identification (ID). After scanning the document, scanned data is stored in the user account of the user registered with the server 300. Then, the user accesses the server 300 using the computer 200, detects the scanned data from the server 300, copies it to the computer 200, and completes scanning.

However, it is inconvenient for the user to perform a scan job as described above. Since the scanner 100 is shared by several users, the user must go to the scanner 100 to determine whether the scanner 100 is available. If the scanner 100 is in use, the user must wait until a scan job is completed or go back to the scanner 100 after the scan job is completed. Also, the user has to access the server 300 again using the computer 200 after a scan job. Furthermore, a network scan system using a server as an additional storage device is expensive to implement.

Meanwhile, since much attention has been paid to security, firewalls are installed in most networks that require basic security. A firewall is a series of related programs that protect sources of a private network from other network users, installed in a network gate server.

In general, a firewall is not installed between a computer and a scanner in an office, but it may be installed on a computer spaced a predetermined distance apart from a scanner. In the case of a network in which a firewall is installed, the firewall would not permit external access to the network except through a specific port, e.g., port No. 80, that uses a HyperText Transfer Protocol (HTTP). Although a multi-functional apparatus with a network scan function has recently been developed, it is impossible to perform a scan job using the multi-functional apparatus unless a port for a network scan connection is held open by the firewall.

SUMMARY OF THE INVENTION

The present general inventive concept provides a method of constructing a network scan system by installing a Hyper-Text Transfer Protocol (HTTP) server module into a computer to access a network scanner, such that the network scanner can communicate with the computer through a firewall, which is installed where the computer is installed, and exchange data with the computer.

The present general inventive concept also provides a network scan system constructed by installing a Hyper-Text Transfer Protocol (HTTP) server module into a computer to access a network scanner, such that the network scanner can communicate with the computer through a firewall, which is installed where the computer is installed, and exchange data with the computer.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of configuring a network scan system, which includes a network scanner accessible by a computer and capable of communicating with the computer through a firewall, the method comprising installing a hypertext transfer protocol (HTTP) server module into the computer, transmitting a uniform resource locator (URL) of the computer to the network scanner using the installed HTTP server module, and transmitting scanned data to the computer from the network scanner using the transmitted URL.

The foregoing and/or other aspects and advantages of the present general inventive concept may also be achieved by providing a network scan system, which includes a network scanner accessible by a computer and capable of communicating with the computer through a firewall, the network scan system comprising a hypertext transfer protocol (HTTP) server module installed into the computer, a URL receiver to receive a uniform resource locator (URL) of the computer in the network scanner, the URL transmitted using the HTTP server module, and a scan data transmitter to transmit scanned data from the network scanner to the computer using the received URL.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
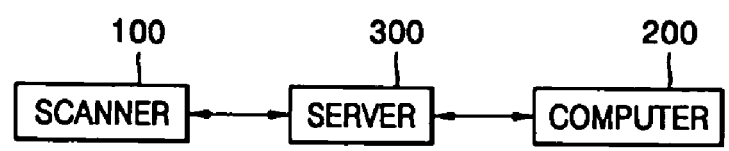
FIG. 1 is a block diagram of a conventional network scan system.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
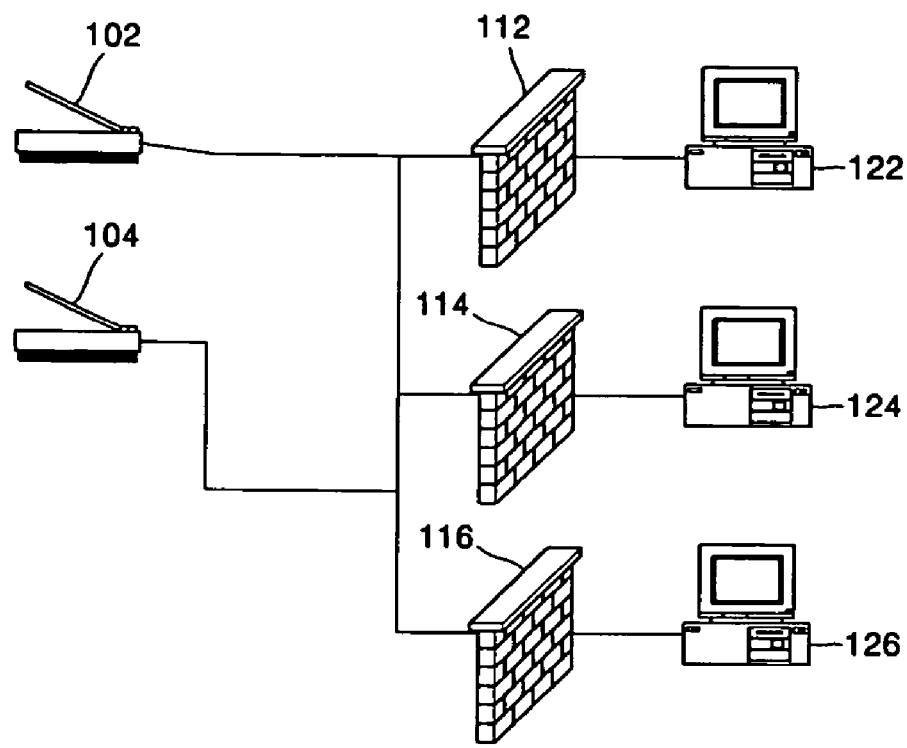
FIG. 2 is a schematic block diagram of a network scan system according to an embodiment of the present general inventive concept.

FIG. 2 is a schematic block diagram illustrating a network scan system according to an embodiment of the present general inventive concept. Referring to FIG. 2, the network scan system includes a plurality of scanners 102 and 104 and a plurality of computers 122, 124, and 126. Firewalls 112, 114, and 116 are installed between the scanners 102 and 104, and each computer 122, 124, and 126. For example, the computer 122 must pass through the firewall 112 to use one of the scanners 102 or 104.

Figure 3:
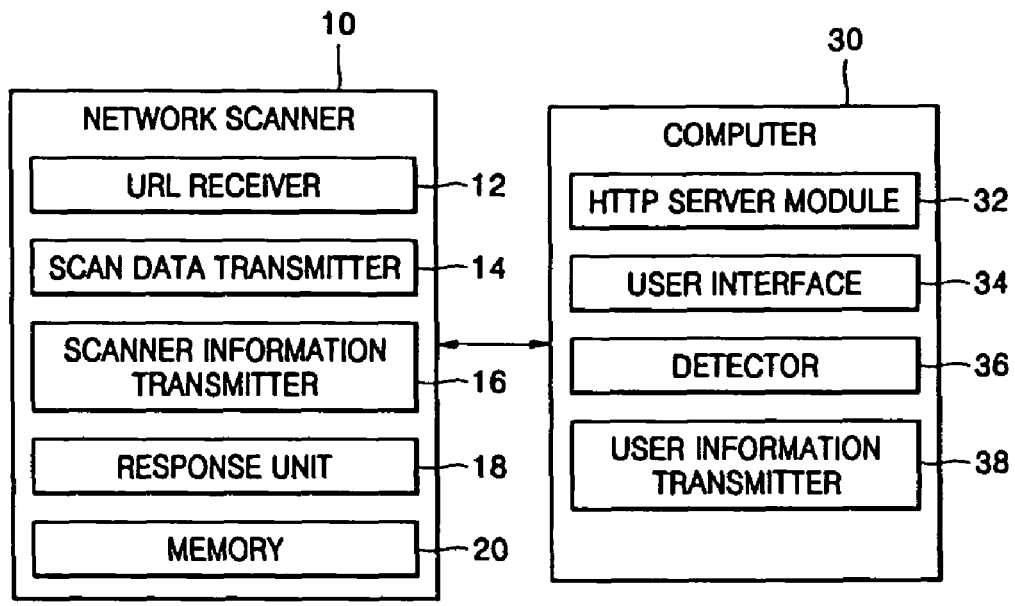
FIG. 3 is a diagram of a network scan system according to an embodiment of the present general inventive concept.

FIG. 3 is a block diagram illustrating a network scan system according to an embodiment of the present general inventive concept. Referring to FIG. 3, the network scan system includes a network scanner 10 and a computer 30. The network scanner 10 includes a uniform resource locator (URL) receiver 12, a scan data transmitter 14, a scanner information, transmitter 16, a response unit 18, and a memory 20. The computer 30 includes a HyperText Transfer Protocol (HTTP) server module 32, a user interface (UI) 34, a detector 36, and a user information transmitter 38.

The URL receiver 12 receives a URL of the computer 30 transmitted by the HTTP server module 32. The scan data transmitter 14 transmits data scanned by the network scanner 10 to the computer 30 using the received URL. When there is a change in scanner information specifying a state of the network scanner 10, the scanner information transmitter 16 transmits the changed scanner information to the computer 30 using the received URL.

The UI 34 of the computer 30 receives an Internet protocol (IP) address of the network scanner 10 from a user of the computer 30. The detector 36 detects the network scanner 10 using the received IP address.

The detected network scanner 10 responds to the computer 30 through the response unit 18.

The user information transmitter 38 of the computer 30 sends the network scanner 10 user information including a user identification (ID) and a password. The user information transmitter 38 and the HTTP server module 32 can periodically transmit the user information and the URL to the network scanner 10, respectively.

The memory 20 of the network scanner 10 stores the user information and the URL transmitted to the network scanner 10.

Figure 4:
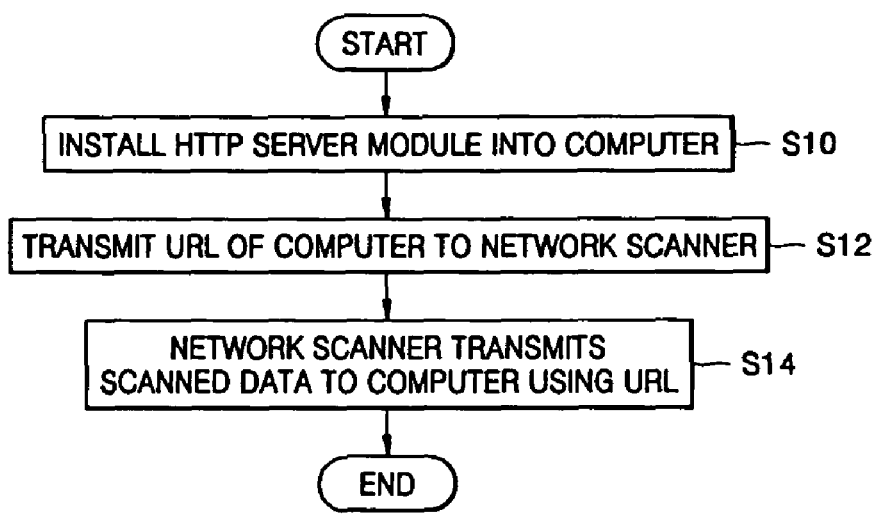
FIG. 4 is a flowchart illustrating a method of configuring a network scan system according to an embodiment of the present general inventive concept.

FIG. 4 is a flowchart illustrating a method of configuring a network scan system including a network scanner and a computer according to an embodiment of the present general inventive concept. Referring to FIG. 4, an HTTP server module is installed into the computer (S10). Next, a URL of the computer is transmitted to the network scanner using the HTTP server module (S12), and the network scanner transmits scanned data to the computer using the URL (S14).

In order to configure the network scan system, as described above, the network scan system must first be installed. Accordingly, a network scanner can be installed in an office. Next, an IP address of the network scanner and information regarding a location of the network scanner on a network are input to the network scanner. Next, network scan software that performs operations related to the network scanner is installed into a user's computer. Lastly, an HTTP server module is installed in the user's computer so that the computer can perform HTTP server operations.

Figure 5:
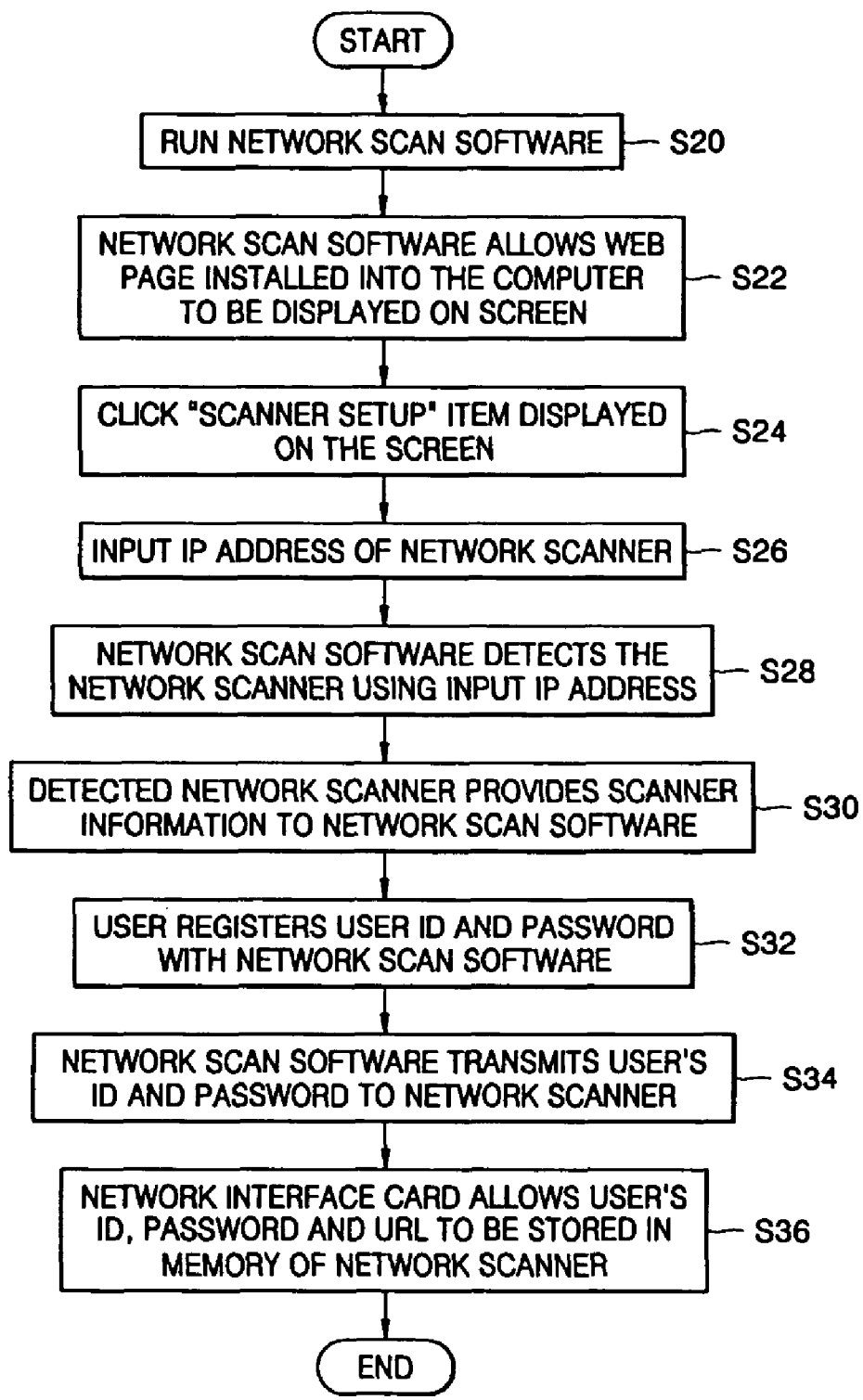
FIG. 5 is a flowchart illustrating a method of setting up a network scanner according to an embodiment of the present general inventive concept.

FIG. 5 illustrates a method of setting up a network scanner in a computer. Referring to FIG. 5, first, a user runs the network scan software (S20) installed in the computer. The network scan software allows a UI, such as a web page, installed in the computer to be displayed on a screen of the computer (S22).

Next, the user clicks a "scanner setup" item, which is displayed on the screen (S24). Next, the user inputs the IP address of a desired network scanner (S26). The network scan software then detects the desired network scanner using the input IP address (S28). The network scan software transmits information regarding the computer, including an IP address and the URL of the computer, to the detected network scanner.

The detected network scanner provides scanner information, which specifies a state of the network scanner, to the network scan software of the computer using the transmitted URL of the computer (S30). Since the HTTP server module installed in the computer enables the computer to perform HTTP server operations, the computer can receive the scanner information from the network scanner using the URL even if a firewall is installed where the computer is installed. Also, when the HTTP server uses a port, e.g., port No. 8080, other than a generally used port, such as port No. 80, data can be exchanged between the computer and the network scanner.

The user registers a user ID and a password, which will be used during a scan job, using the network scan software (S32). Next, the network scan software transmits user information including the user ID and the password to the network scanner (S34).

A network interface card included in the network scanner allows the user information and the URL of the computer transmitted from the computer to be stored in a memory of the network scanner (S36).

After the setup of the network scanner, the network scan software periodically transmits the user information, including the user ID and the password, and the URL to the network scanner at predetermined intervals of time. The network scanner makes a user list using user information corresponding to a plurality of users and URLs of a plurality of computers. If the network scanner does not receive the user information and the URL within a predetermined length of time, the network scanner can delete the user information and the URL from the user list.

When there is a change in the scanner information specifying the state of the network scanner, the network scanner transmits the changed scanner information to the computer using the URL. The state of the network scanner may correspond to an idle state, a busy state, a log-in state, or an error state. The idle state indicates where the network scanner is available, the busy state indicates where the network scanner is performing a scan job, the log-in state indicates where the user logs in to the network scanner, and the error state indicates where an error occurs in the network scanner due to for example, a paper jam.

When there is a change in the state of the network scanner, the network scanner can access the URL of the computer to inform the network scan software of the computer of the change. Accordingly, the user can notice the state of the network scanner using the network scan software.

Figure 6:
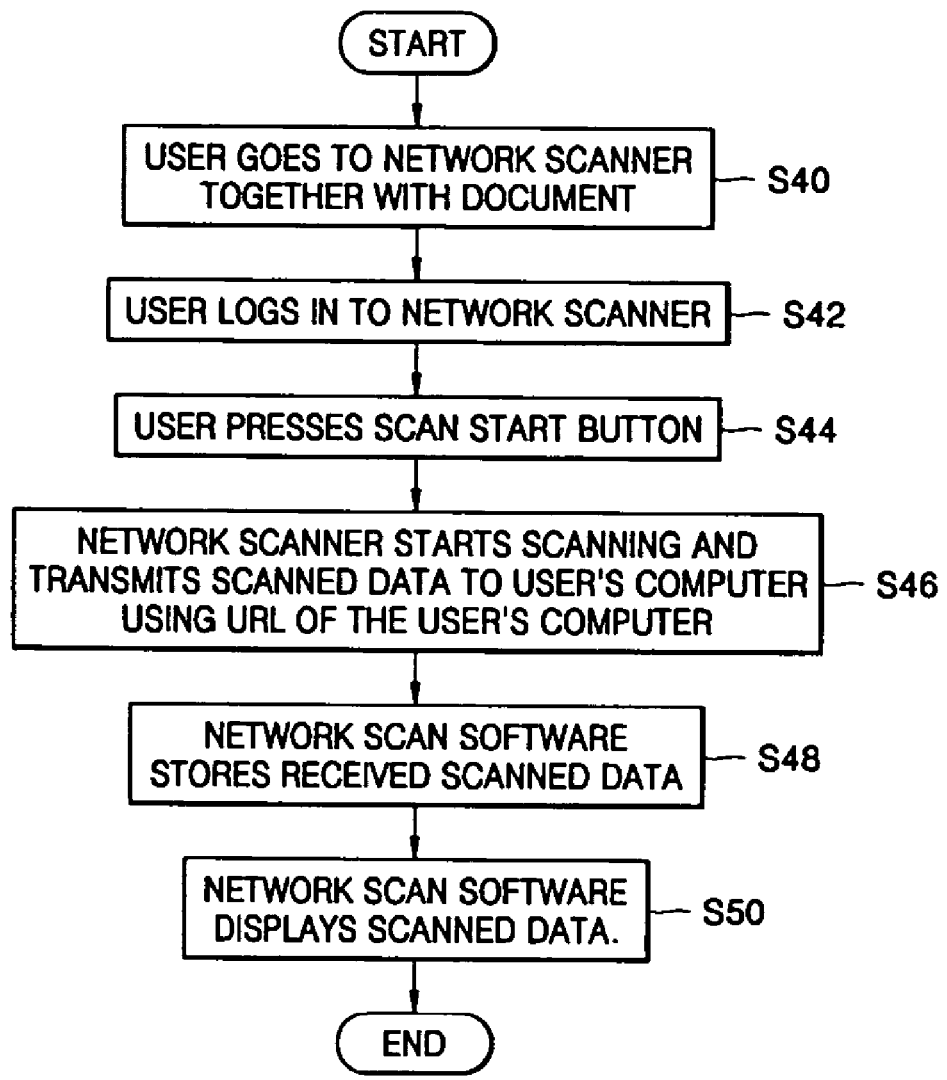
FIG. 6 is a flowchart illustrating a method of performing a scan job according to an embodiment of the present general inventive concept.

FIG. 6 illustrates a method of performing a scan job according to an embodiment of the present general inventive concept using the network system. Referring to FIG. 6, first, a user determines whether the network scanner is available, for example, whether the network scanner is in the idle state, and brings a document to be scanned to the network scanner (S40). Next, the user logs in to the network scanner using the user identification and the password (S42). Then, the network scanner enters the log-in state and informs computers accessing the network scanner using the URLs of the computers, which are listed in the user list, of the state of the network scanner.

The network scanner uses the URL of the computer of the user who has logged in to the network scanner to access the computer, and obtains scan setting information set by the user. The scan setting information may specify resolution and compression techniques that are supported by the network scanner. Before a scan job, the user may check the scan setting information and change the scan setting information if necessary. Since the network scanner uses the URL of the computer to access the computer, and obtains the scan setting information, the user need not set the scan setting information required to use the network scanner every time the user performs a scan job.

Next, the user presses a "scan start" button to activate the network scanner (S44). Then, the network scanner scans the document and transmits scanned data directly to the computer of the user using the URL of the computer (S46). Next, the network scan software of the computer stores the transmitted scanned data (S48) in a memory of the computer. After scanning the document, the user retrieves the document from the memory of the computer. The network scan software may automatically display the scanned data on the screen of the computer (S50).

The present general inventive concept has been described above with respect to a network scanner, but it is applicable to a network multi-functional apparatus as well. The multi-functional apparatus is an apparatus which performs operations of at least one of a scanner, a printer, a copy machine, and a facsimile, etc.

As described above, a network scanning system according to the present general inventive concept, allows exchange of data between a network scanner and a computer using an HTTP server module installed into the computer even if a firewall is installed.

Since a network scanning system according to the present general inventive concept does not require an additional server to store scanned data, it is possible to reduce manufacturing costs of the network scan system. Also, since scanned data is stored in a user's computer using a URL of the user's computer, the user does not need to access a server to detect the scanned data.

If an HTTP server uses a port, e.g., port No. 8080, other than port No. 80 that is generally used as an HTTP port, it is possible to allow exchange of data between a computer and a network scanner, according to the present general inventive concept.

Also, since a user can determine a state of the network scanner, i.e., whether the network scanner is available, using the user's computer, the user need not go to the network scanner to determine the state of the network scanner or wait at the network scanner until the network scanner is available.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of configuring a network scan system, which includes a network scanner accessible by a plurality of computers to at least scan, print, transmit, and receive information, and to communicate with at least one computer of the plurality of computers through a firewall, the method comprising:
   installing a hypertext transfer protocol (HTTP) server module into the at least one computer;
   inputting into the computer an Internet protocol (IP) address of the network scanner via a user interface provided by the at least one computer;
   detecting the network scanner using the input IP address of the network scanner in the at least one computer;
   transmitting a uniform resource locator (URL) of the at least one computer to the network scanner using the HTTP server module;
   receiving scanned data from the network scanner using the URL; and
   periodically transmitting at predetermined intervals of time user information and the URL to the network scanner from each of the plurality of computers.

2. The method of claim 1, further comprising:
   responding to the at least one computer in the network scanner using the transmitted URL; and
   transmitting user information, which contains a user identification and a password, to the network scanner from the at least one computer.

3. The method of claim 2, further comprising:
   storing the transmitted user information and the transmitted URL in a memory of the network scanner.

4. The method of claim 1, further comprising:
   when there is a change in scanner information specifying a state of the network scanner, transmitting the changed scanner information to the at least one computer from the scanner using the transmitted URL.

5. The method of claim 1, wherein the user information specifies a user identification and a password.

6. The method of claim 5, further comprising:
   including the transmitted user information and the transmitted URL in a user list in the network scanner; and
   deleting the user information and the URL from the user list when the user information and the URL are not transmitted to the network scanner within a predetermined length of time.

7. A method of scanning an image in a network scan system including a plurality of computers and a network scanner communicating with the computer to at least scan, print, transmit, and receive information, the method comprising:
   inputting into at least one computer of the plurality of computers an Internet protocol (IP) address of the network scanner via a user interface provided by the at least one computer;

detecting the network scanner using the input IP address of the network scanner in the at least one computer;
transmitting to the network scanner a uniform resource locator (URL) address of the at least one computer in the network scan system;
scanning an image in the network scanner;
receiving the scanned image directly from the network scanner through the transmitted URL address; and
periodically transmitting at predetermined intervals of time user information and the URL to the network scanner from each of the plurality of computers.

8. The method of claim 7, wherein the scanning of the image comprises:
logging in to the network scanner using a user ID and a password;
determining whether the user ID and the password are authorized; and
scanning the image when the user ID and the password are authorized.

9. The method of claim 7, further comprising:
transmitting scanner information from the network scanner to the at least one computer using the URL of the at least one computer to update a state of the network scanner.

10. The method of claim 9, wherein the state of the network scanner comprises one of an idle state, a busy state, a log-in state, or an error state.

11. A method of receiving data from a network scanner to at least scan, print, transmit, and receive information in a network scanning system, the method comprising:
inputting into at least one computer of a plurality of computers an Internet protocol (IP) address of the network scanner via a user interface provided by the at least one computer;
detecting the network scanner using the input IP address of the network scanner in the at least one computer;
transmitting a uniform resource locator (URL) address of the at least one computer to the network scanner;
receiving a scanned image from the network scanner through the transmitted URL address;
storing the received scanned image; and
periodically transmitting at predetermined intervals of time user information and the URL to the network scanner from each of the plurality of computers.

12. The method of claim 11, wherein the transmitting of the URL address of the at least one computer comprises:
inputting an IP address of the network scanner in the at least one computer; and
transmitting the URL address from the at least one computer to the network scanner using the input IP address of the network scanner.

13. A network scan system, including a network scanner to be accessible by a computer to at least scan, print, transmit, and receive information, and to communicate with the computer through a firewall, the network scan system comprising:
a hypertext transfer protocol (HTTP) server module installed in the computer to transmit a uniform resource locator (URL) of the computer;
a URL receiver provided in the network scanner to receive the transmitted URL of the computer in the network scanner;
a scan data transmitter provided in the network scanner to transmit scanned data from the network scanner to the computer using the received URL;
a user interface provided in the computer to receive an Internet protocol (IP) address of the network scanner from a user of the computer;
a detector provided in the computer to detect the network scanner using the received IP address of the network scanner; and
a response unit provided in the network scanner to respond to the computer using the URL, the response unit included in the detected network scanner,
wherein the user information transmitter periodically transmits at predetermined intervals of time user information from each of the plurality of computers to the network scanner, and the HTTP server module periodically transmits the URL to the network scanner.

14. The network scan system of claim 13, further comprising:
a user information transmitter provided in the computer to transmit user information including a user identification and a password from the computer to the network scanner.

15. The network scan system of claim 14, further comprising:
a memory provided in the network scanner to store the user information and the URL received by the URL receiver.

16. The network scan system of claim 13, further comprising:
a scanner information transmitter provided in the scanner to transmit scanner information to specify a state of the network scanner from the network scanner to the computer using the URL of the computer when there is a change in the scanner information.

17. A network scanner to at least scan, print, transmit, and receive information, and to communicate with one or more computers over a network and through a firewall, the network scanner, comprising:
a URL receiver to receive URL addresses of one or more computers over a network;
a scanning unit to scan an image;
a scan data transmitter to transmit the scanned image to one of the received URL addresses; and
a memory to store the received URL addresses,
wherein the memory stores a user list comprising a plurality of user information to authorize a user, and the scan data transmitter chooses one of the stored URL addresses according to an input user information, and transmits the scanned image to the chosen URL address,
wherein the URL addresses and the user information are periodically received at predetermined intervals of time by the network scanner from the one or more computers.

18. The network scanner of claim 17, wherein each of the user information specifies a user ID and a password.

19. The network scanner of claim 17, further comprising:
a scanner information transmitter to transmit scanner information regarding a state of the network scanner.

20. A network scan system including a plurality of computers and a network scanner communicating with at least one of the plurality of computer to at least scan, print, transmit, and receive information, the system comprising:
a user interface provided in the at least one computer to receive an Internet protocol (IP) address of the network scanner from a user of the at least one computer;
a detector provided in the at least one computer to detect the network scanner using the received IP address of the network scanner;
a uniform resource locator (URL) receiver provided in the network scanner to receive the address of the at least one computer from the plurality of computers in the network scan system;
the network scanner to scan an image in the network scanner; and a scan data transmitter to transmit the scanned image directly to the at least one computer using the received URL address of the at least one computer, wherein each of the plurality of computers periodically transmits at predetermined intervals of time user information and the URL to the network scanner.

21. A network scan system including a plurality of computers and a network scanner communicating with at least one of the plurality of computers to at least scan, print, transmit, and receive information, the system comprising:

a user interface provided in the at least one computer to receive an Internet protocol (IP) address of the network scanner from a user of the at least one computer;

a detector provided in the at least one computer to detect the network scanner using the received IP address of the network scanner;

a uniform resource locator (URL) receiver provided in the network scanner to receive the address of the at least one computer from the plurality of computers in the network scan system;

a scan data transmitter to transmit the scanned image directly to the at least one computer using the received URL address of the at least one computer; and a storage device provided at the at least one computer to store the received scanned image, wherein each of the plurality of computers periodically transmits at predetermined intervals of time user information and the URL to the network scanner.

* * * * *